(12) United States Patent
Södergard et al.

(10) Patent No.: US 7,919,566 B2
(45) Date of Patent: Apr. 5, 2011

(54) LACTIC ACID POLYMERS

(75) Inventors: Nils Dan Anders Södergard, Turku (FI); Erik Mikael Stolt, Turku (FI)

(73) Assignee: Tate & Lyle Public Limited Company, London (GB)

( * ) Notice: Subject to any disclaimer, the term of this patent is extended or adjusted under 35 U.S.C. 154(b) by 0 days.

(21) Appl. No.: 12/017,498

(22) Filed: Jan. 22, 2008

(65) Prior Publication Data

US 2008/0177009 A1    Jul. 24, 2008

Related U.S. Application Data

(60) Provisional application No. 60/911,560, filed on Apr. 13, 2007.

(30) Foreign Application Priority Data

Jan. 22, 2007  (GB) .................................. 0701168.7

(51) Int. Cl.
*C08G 67/00* (2006.01)

(52) U.S. Cl. ................ 525/411; 264/328.1; 264/331.18; 521/134; 525/410; 525/415; 525/419; 525/420; 525/450; 525/451

(58) Field of Classification Search ............... 264/328.1, 264/331.18; 521/134; 525/410, 411, 415, 525/419, 420, 450, 451
See application file for complete search history.

(56) References Cited

U.S. PATENT DOCUMENTS

| | | | |
|---|---|---|---|
| 5,317,064 A | 5/1994 | Spinu | 525/411 |
| 5,594,095 A * | 1/1997 | Gruber et al. | 528/354 |
| 5,725,881 A | 3/1998 | Buchholz et al. | 424/486 |
| 6,365,173 B1 | 4/2002 | Domb et al. | 424/426 |
| 2005/0001358 A1 * | 1/2005 | Nakazawa et al. | 264/331.18 |

FOREIGN PATENT DOCUMENTS

| | | |
|---|---|---|
| EP | 0 272 902 A2 | 6/1988 |
| EP | 0 438 426 B1 | 7/1991 |
| EP | 1 460 107 A1 | 9/2004 |
| JP | 017163 | 1/2000 |
| JP | 114905 | 4/2001 |
| JP | 326662 | 11/2002 |
| JP | 128797 | 5/2003 |
| JP | 2005/325285 | 11/2005 |
| JP | 2005/325286 | 11/2005 |
| JP | 070102 | 3/2006 |
| WO | WO92/04413 | 3/1992 |
| WO | WO01/42333 | 6/2001 |
| WO | WO2005/044918 | 5/2005 |
| WO | WO2005/063885 | 7/2005 |

OTHER PUBLICATIONS

Biela, T.; Duda, A.; Penczek, S.; Macromolecules, 2006, 39, 3710-3713.*
Ebewele, Robert O.; Polymer Science and Technology, 2000, CRC Press, Boca Raton, New York.*
Tsuji, H.; Ikada, Y.; Macromolecules, 1993, 26, p. 6918-6926.*
Dorgan, J.R.; Lehermeier, H.J.; Polymer Engineering and Science, Dec. 2001, 41, 12, p. 2172-2184.*
Biela, T.; Duda, A.; Rode, K.; Pasch, H.; Polymer, 2003, 44, p. 1851-1860.*
Ikada, Y.; Tsuji, H.; Journal of Applied Polymer Science, 1994, 53, 1061-1071.*
Dong, C.M.; Qiu, K.Y.; Gu, Z.W.; Feng, X.D.; Journal of Polymer Science: Part A: Polymer Chemistry, 2002, 40, 409-415.*
Biela, T.; Duda, A.; Pasch, H.; Rode, K.; Journal of Polymer Science: Part A: Polymer Chemistry, 2005, vol. 43, p. 6116-6133.*
GB Application No. 0701168.7 Search Report (May 22, 2007).
Biela et al., *Macromolecules* 39:3710-3713 (2006).
Fukushima et al., *Polymer International* 55:626-642 (2006).
Tsuji et al., *Macromol. Biosci.* 5:569-597 (2005).

* cited by examiner

*Primary Examiner* — Ling-Siu Choi
*Assistant Examiner* — Robert Jones
(74) *Attorney, Agent, or Firm* — Williams, Morgan and Amerson, P.C.

(57) ABSTRACT

A blend of a multiply branched lactic acid polymer of one steric configuration with a linear lactic acid polymer of the opposite steric configuration has different and more useful properties than either component alone.

13 Claims, 5 Drawing Sheets

LACTIC ACID POLYMERS

This application claims priority from UK patent application 0701168.7, filed on Jan. 22, 2007, and U.S. provisional application 60/911,560, filed on Apr. 13, 2007.

The present invention relates to a series of new lactic acid polymers having improved physical properties.

EP0272902A2 discloses compositions comprising segments of poly(R-lactides) interlocked with segments of poly (S-lactides). These compositions are said to have better, i.e. higher, melting points than the individual enantiomers themselves.

WO 92/04413 describes lactide based polymer compositions in combination with plasticisers and in blends.

EP 0438 426 B1 describes the controlled release of biologically active compounds from stereocomplexes of D and L polylactide stereohomopolymers.

U.S. Pat. No. 6,365,173 B1 claims stereocomplexes of polylactic acid for sustained release of bioactive molecules.

U.S. Pat. No. 5,317,064 describes stereocomplexes of poly-D-lactic acid and poly-L-lactic acid manufactured by separately polymerising the lactide of one stereoform in the presence of the polymer of an opposite stereoform.

In EP1460107 A1 efforts have been made to resolve the problem of having too low a heat resistance in polylactide polymers. This patent discloses moulded articles with an increased distortion temperature consisting of melt-mixed poly(L-lactide) and poly(D-lactide), further including nucleating agents such as an aromatic organic phosphate and hydrotalcite. For example, an injection moulded sample containing 50 parts per weight poly(L-lactide), 50 parts per weight poly(D-lactide), 1 part per weight talc, 0.5 parts per weight aluminium bis[2,2'-methylenebis-(4,6-di-t-butylphenyl)-phosphate] hydroxide and 0.5 parts per weight of $Li_{1.8}Mg_{0.6}Al_4(OH)_{18}CO_3 \cdot 3.6H_2O$ showed a distortion temperature of 150° C. However, when a similar injection moulded piece of a poly(L-lactide) and poly(D-lactide) 50/50-blend without the additional nucleating agents was made, a distortion temperature of only 70° C. was obtained, which is marginally higher than for a poly(L-lactide) injection moulded piece (58° C.). Thus, EP 1460107 A1 teaches us that the heat distortion temperature for polylactide polymers can be improved by careful choice of additional nucleating compounds. However, the heat resistance could not be significantly improved by blending poly(L-lactide) and poly(D-lactide) without the additional organic phosphates and hydrotacite compounds.

WO2005063885 and WO20005044918 are directed towards stereocomplex blends of poly(D-lactide) and poly(L-lactide). These applications teach how to obtain preferentially stereocomplex crystals over the homocrystals by using additional compounds, such as an aromatic urea compound or chemically bonded clay minerals, as crystallizing agents.

JP2005325285 and JP2005325286 (according to Chemical Abstracts numbers 143:478996 and 143:478998, respectively) disclose high heat distortion temperatures for polylactide polymer films of blends containing 30-70 parts poly(L-lactic acid) and 30-70 parts poly(D-lactic acid). The disclosed methods of preparation include stretching the films more than 2-fold in one direction and heating at high temperatures while fixing the film. Although the polylactide polymers show improved heat distortion temperature, the preparation methods are only applicable in making films, and furthermore consume time and energy, which are not desirable in an industrial process.

We have now surprisingly discovered that the use of a multiply branched lactic acid polymer of one steric configuration with a linear lactic acid polymer of the opposite steric configuration, results in a polymer composition having different properties from those of the composition disclosed in EP0272902A2. In particular, by using an appropriate proportion of the multiply branched polymer, it is possible to achieve blends having high melting point, i.e. high heat resistance. Moreover, we have surprisingly found that the melting temperature of the blend is dependent on the arm length of the multiply branched polymer.

Thus, the present invention consists in a polymer composition comprising: a first lactic acid polymer which comprises at least three chains of lactic acid units attached to a polyfunctional initiator residue, at least a segment of each chain being in the R- or the S-configuration; and a second lactic acid polymer which is linear and contains at least a segment which has a steric configuration opposite to the steric configuration of the lactic acid polymer chains of the first polymer.

In the accompanying drawings:

FIG. 1 shows the molar mass [depicted as $M_n$ divided by the number of arms in the star-shaped oligomeric poly(D-lactide)] vs. the melting temperature of the product of Example 4;

and FIG. 2 shows the molar mass [depicted as $M_n$ divided by the number of arms in the star-shaped oligomeric poly(D-lactide)] vs. the melt enthalpy of the product of Example 4;

Figure 1:
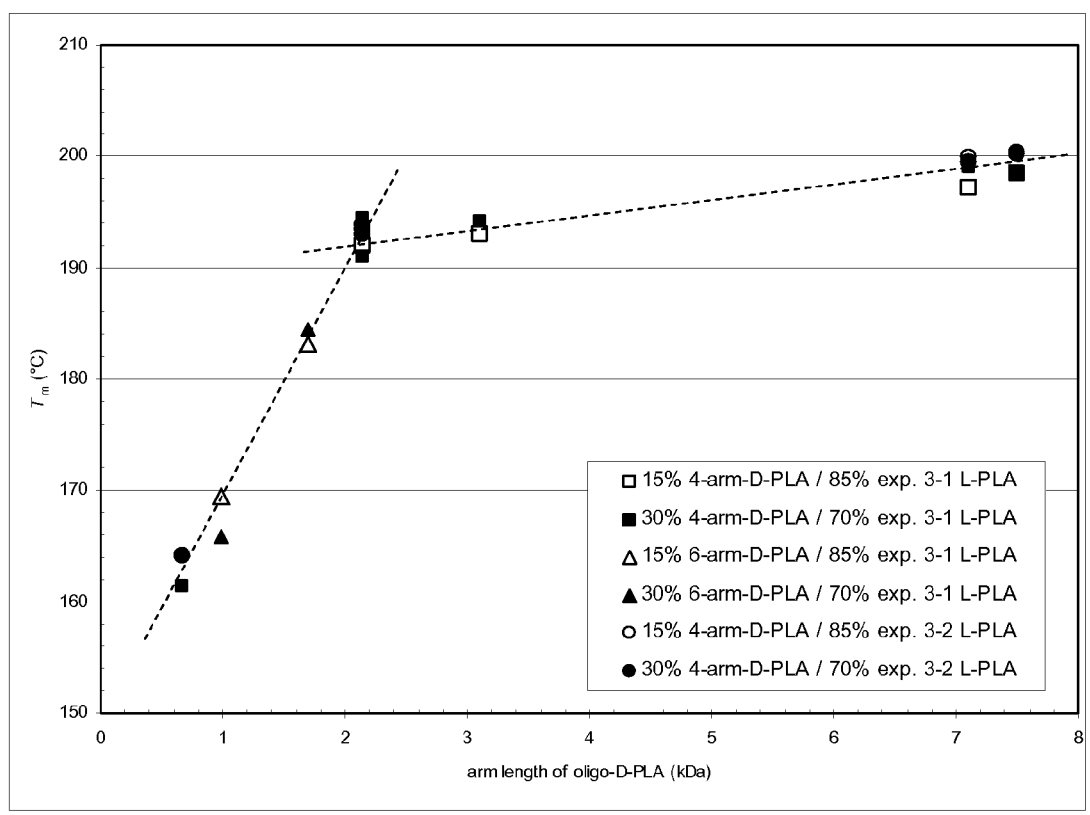

The first polymer, hereafter referred to herein as the "star shaped polymer", preferably has the formula (I) or (II):

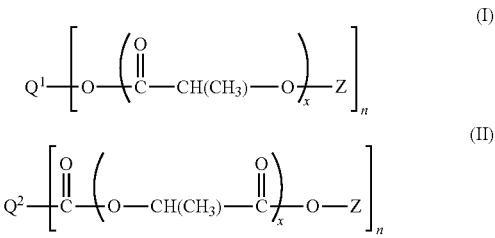

in which:
$Q^1$ represents a residue of a polyhydroxy compound having at least 3 hydroxy groups;
$Q^2$ represents a residue of a polycarboxylic acid having at least 3 carboxylic acid groups;
x is the degree of polymerisation;
Z is an end group; and
n is an integer of at least 3.

Alternatively, it may be a polymer of the above formula (I) or (II) having, in addition to the lactic acid units shown, one or more copolymerised chains of a different monomer.

In the above formula, the degree of polymerisation, x, is preferably from 15 to 1000, more preferably from 30 to 500. The nature of the end groups Z will depend on the nature of the initiator furnishing the group Q1 or Q2, and will normally be a hydrogen atom. However, in some cases, the terminal group may be another group, e.g. an ester group.

The chain-length of a branch in the star shaped polymer is of importance for controlling certain properties, such as, for instance, the crystallization behaviour. With an optimum chain-length corresponding to 15-45 repeating lactoyl units a fast stereoblend crystallization is enabled. This can be an advantage in the manufacture of end-products in terms of a reduced cycle-time during the processing step. The effect of the chain-length will, on the other hand, become less relevant at a certain degree of polymerisation, after which certain properties remain on a constant level, for example the melting point of the stereoblend. This, together with the chain-length dependent phenomena, offer possibilities to optimise the properties of the stereoblends by combining star shaped polymers with different chain lengths with each other at given ratios.

The n chains of the first lactic acid polymer all preferably have the same steric configuration, i.e. all R- or all S-. The chains of the first polymer are preferably all R- or all S-, while the chain or chains of the second polymer are preferably all S- or all R-, respectively.

Thus, the chains of the first, or star shaped, polymer may be wholly or predominantly R, while the chain or chains of the second, or linear, polymer are wholly or predominantly S, or the chains of the first, or star shaped, polymer, may be wholly or predominantly S, while the chain or chains of the second, or linear, polymer are wholly or predominantly R.

Although we do not wish to be bound by any theory, we believe that the second polymer is interlocked with at least one chain of the first polymer, thereby leading to the new properties of the composition. Thus, the poly(R-lactide) segments of one polymer interlock with the poly(S-lactide) segments of the other polymer. The term "interlock" as used herein means that each segment constrains independent movement of the other segment. In this sense, the segments interact, but are not so tightly bound to each other that they might be considered to be cross-linked. Derivatives of the word "interlock" are to be construed accordingly.

The first and second polymers are preferably homopolymers, but may, if desired, be copolymers of lactic acid with one or more copolymerisable monomers, provided that the homopolymer segments are sufficiently long to permit interlocking with the corresponding segments of the other polymer. In general, this may be shown by the copolymer exhibiting a crystalline melting transition characteristic of lactide. Examples of suitable such comonomers include: lactones, such as ε-caprolactone, β-propiolactone or δ-valerolactone; and other hydroxy acids, such as glycolic acid.

The first, or star shaped, polymer may be prepared by polymerising lactic acid, lactide or a lactic acid oligomer in the presence of an initiator which is a polyfunctional carboxylic acid (i.e. having 3 or more carboxylic acid groups) or polyhydroxy compound (i.e. having 3 or more free hydroxy groups), and optionally comonomer(s). The reaction is normally and preferably carried out in the presence of a catalyst. The reaction may be a polycondensation reaction of lactic acid or a lactic acid oligomer, or it may be a ring-opening polymerisation of lactide, in either case, the D- or L-isomer being used, as required.

Examples of suitable polycarboxylic acids for use as the initiator include 1,2,3,4,5,6,-cyclohexanehexacarboxylic acid, 1,2,3,4-butanetetracarboxylic acid, trimellitic acid, and pyromellitic acid. Anhydrides of these acids may also be used. The preferred polycarboxylic acids are 1,2,3,4,5,6,-cyclohexanehexacarboxylic acid and 1,2,3,4-butanetetracarboxylic acid. Examples of suitable polyhydroxy compounds include trimethylolpropane, di-trimethylolpropane, pentaerythritol, dipentaerythritol, and inositol.

The second, or linear, polymer may be prepared by polymerising lactic acid, lactide or a lactic acid oligomer in the presence or absence of initiator(s) and/or catalyst(s) as well as comonomers according to standard polymerisation methods known in the art.

Examples of suitable dicarboxylic acids for use as the initiator include maleic acid, succinic acid, methylsuccinic acid, glutaric acid, adipic acid, oxalic acid, malonic acid, terephthalic acid, isophthalic acid, 2,6-naphthalenedicarboxylic acid, 2,7-naphthalenedicarboxylic acid, 1,4-naphthalenedicarboxylic acid, 3,4'-diphenyl ether dicarboxylic acid, and 4,4'-diphenyl ether dicarboxylic acid. Anhydrides of these acids may also be used. Examples of suitable dihydroxy compounds include 1,4-butanediol, ethylene glycol, propylene glycol, 1,3-butanediol, and glycerol, of which 1,4-butanediol is preferred.

The degree of polymerisation of the second, or linear, polymer is preferably from 15 to 5000, more preferably from 30 to 1000.

Other than by the use of a tri- or higher functional carboxylic acid or hydroxy compound as the initiator in the star shaped polymer and the use of a difunctional carboxylic acid or hydroxy compound as the initiator in the linear polymer, the preparation of the two types of polymer may be carried out in the same manner and using the same components.

The polymerisation reactions may be carried out under any conditions known in the art for the polymerisation of such monomers, but is preferably carried out in the presence of a catalyst, and preferably with heating. Any catalyst known for use in such polymerisation reactions may equally be used here, and examples of suitable catalysts include such esterification catalysts as: acids, such as p-toluenesulphonic acid or sulphuric acid; metallic or organometallic compounds containing elements of groups I-VIIIA and/or groups IB-VIIB in the Periodic Table of Elements, including compounds of lithium, calcium, magnesium, manganese, zinc, lead, titanium, germanium, antimony, cobalt, or tin, especially compounds of titanium, germanium, antimony, cobalt, or tin, for example titanium (IV) butoxide or titanium acetylacetonate.

The polymerisation reaction may take place at ambient temperature, depending on the catalyst and monomers used, but is preferably carried out with heating, e.g. to a temperature of from 100° C. to 250° C., more preferably 140° C. to 210° C., and most preferably from 150° C. to 190° C.

The reaction is carried out under conditions such as to remove the water, if any, formed in the course of the reaction, i.e. at temperature of at least 100° C. and preferably under sub-atmospheric pressure, more preferably under vacuum.

The reaction is preferably carried out in the absence of any solvent other than the reagents, but, if desired, an organic solvent may be present. If used, examples of such organic solvents include: ethers, such as diphenyl ether, and dioxane; and hydrocarbons, such as toluene, xylene, and dodecane.

The reaction is preferably carried out under essentially anhydrous conditions.

The first and second polymers may simply be blended together. However, it is preferred that they should be mixed by co-extrusion at elevated temperature or by solvent casting, in which the two polymers are dissolved together in a solvent, followed by evaporation of the solvent. Suitable solvents include chloroform, methylene chloride, 1,2-dichloroethane, sulfolane, N-methylpyrrolidone, dimethylformamide, tetrahydrofuran, and γ-butyrolactone.

There is no particular restriction on the relative proportions of the two types of polymer, although, if the amount of one polymer is too low, the benefits of the present invention may not be perceptible. Preferably, the weight ratio of the first polymer to the second polymer is from 99.99:0.01 to 0.01:99.99, more preferably from 99:1 to 1:99, even more preferably from 95:5 to 5:95, and still more preferably from 90:10 to 10:90.

The invention is further illustrated by the following non-limiting Examples.

EXAMPLE 1

Experiments 1-1 to 1-9

Preparing Star Shaped Oligomeric Poly(D-Lactide)s by Ring-Opening Polymerisation D-lactide was ring-opening polymerised at 165° C. under an inert atmosphere in a round-bottomed glass beaker using a laboratory magnetic stirrer for mixing and a thermostated oil bath for heating to the desired polymerization temperature. The amount of initiator added was based on standard molar calculations for obtaining a certain $M_n$. About 0.1 wt % stannous 2-ethylhexanoate was used as catalyst. The analysed polymer characteristics can be seen in Table 1 below.

EXAMPLE 2

Experiments 2-1 and 2-2

Preparing Oligomeric Poly(D-Lactide)s Through Polycondensation

D-lactic acid was polycondensation polymerised in a laboratory rotary evaporator according to known methods in the art. The amount of "initiator" added was based on standard molar calculations for obtaining a certain $M_n$. After polymerisation the polycondensates were purified by solvent/non-solvent purification technique. The analysed polymer characteristics after purification can be seen in Table 2 below:

TABLE 2

| Experiment No. | "Initiator" | $M_n$ kDa | $M_w$ kDa | $M_w/M_n$ | $T_g$ °C. | $T_m/\Delta H_m$ °C./J/g |
|---|---|---|---|---|---|---|
| 2-1 | pentaerythritol | 5.0 | 9.7 | 1.94 | 49 | 148/20 |
| 2-2 | 1,4-butanediol | 4.4 | 6.5 | 1.47 | 47 | 147/40 |

Both oligomeric poly(D-lactide)s contained less than 1% lactide.
Thermal properties are given from the second heating cycle.

EXAMPLE 3

Experiments 3-1 to 3-3

Standard Linear High Molar Mass Poly(L-Lactide) Prepared Through Ring-Opening Polymerisation L-lactide containing different amounts of meso-lactide was ring-opening polymerised in the melt using stannous 2-ethylhexanoate as catalyst according to known methods in the art. After the polymerisation the catalyst was quenched using a phosphor-containing compound and residual lactide was removed from the polymer melt by devolatilisation at a reduced pressure. The analysed polymer characteristics after the catalyst quenching and polymer purification can be seen in Table 3 below:

TABLE 1

| Experiment No. | "Initiator" | $M_n$ kDa | $M_w$ kDa | $M_z$ kDa | $M_w/M_n$ | $IV_n$ dL/g | $T_g$ °C. | $T_c/\Delta H_c$ °C./J/g | $T_m/\Delta H_m$ °C./J/g |
|---|---|---|---|---|---|---|---|---|---|
| 1-1 | pentaerythritol | 2.7 | 3.3 | 3.9 | 1.20 | 0.05 | 28 | n.d. | n.d. |
| 1-2 | pentaerythritol | 8.6 | 12.4 | 15.8 | 1.44 | 0.14 | 42 | 119/−2 | 146/3 |
| 1-3 | pentaerythritol | 12.4 | 15.2 | 18.2 | 1.22 | 0.19 | 48 | 125/−9 | 153/9 |
| 1-4 | pentaerythritol | 28.4 | 41.9 | 55.2 | 1.47 | 0.38 | 48 | 125/−31 | 162/31 |
| 1-5 | pentaerythritol | 30.0 | 45.8 | 66.6 | 1.53 | 0.41 | 46 | 122/−28 | 159/29 |
| 1-6 | dipentaerythritol | 5.9 | 6.8 | 7.6 | 1.15 | 0.07 | 36 | n.d. | n.d. |
| 1-7 | dipentaerythritol | 10.2 | 11.7 | 13.2 | 1.15 | 0.11 | 43 | n.d. | n.d. |
| 1-8 | inositol | 66.9 | 106.9 | 138.7 | 1.59 | 0.71 | 53 | 131/−22 | 165/24 |
| 1-9 | inositol | 73.5 | 129.1 | 178.7 | 1.76 | 0.94 | 54 | 135/−12 | 169/18 |

All polymers contained ca 3% lactide. Thermal properties given from second heating cycle. Abbreviations (also used hereafter):
n.d. = none detected.
$T_g$ = glass transition temperature
Tc = Crystallisation temperature
Tm = Melt temperature
IVn = Intrinsic viscosity
ΔHc = Crystallisation enthalpy
ΔHm = Melt enthalpy
$M_n$ = number average molecular weight
$M_w$ = weight average molecular weight
$M_z$ = z average molecular weight

TABLE 3

| Experiment No. | $M_n$ kDa | $M_w$ kDa | $M_z$ kDa | $M_w/M_n$ | res. lactide % | $T_g$ °C. | $T_c/\Delta H_c$ °C./J/g | $T_m/\Delta H_m$ °C./J/g | D/L |
|---|---|---|---|---|---|---|---|---|---|
| 3-1 | 60.7 | 103.8 | 143.4 | 1.7 | 0.67 | 61 | n.d. | n.d. | 5.5/94.5 |
| 3-2 | 72.9 | 127.4 | 180.6 | 1.7 | 0.81 | 57 | 137/<−1 | 162/<1 | 4.8/95.2 |
| 3-3 | 60.4 | 112.2 | 162.4 | 1.9 | 0.56 | 60 | n.d. | 165/14 | 2.9/97.1 |

Thermal properties are given from the second heating cycle.

EXAMPLE 4

The Influence of the Oligomeric Poly(D-Lactide) Molar Mass and Blend Ratio on the D/L-Polylactide Blend Thermal Properties Oligomeric star-shaped poly(D-lactide) having different number-average molar masses from Example 1 and linear poly(L-lactide) having different amounts of D-lactoyl units in the polymer chain from Example 3 were blended by a solvent casting technique known in the art. Specifically, the polymers were dissolved and thoroughly mixed in chloroform, after which the chloroform was allowed to evaporate slowly (over a matter of several days) and the thus obtained films were further dried under vacuum for at least a week before thermal analysis performed by DSC.

Figure 2:
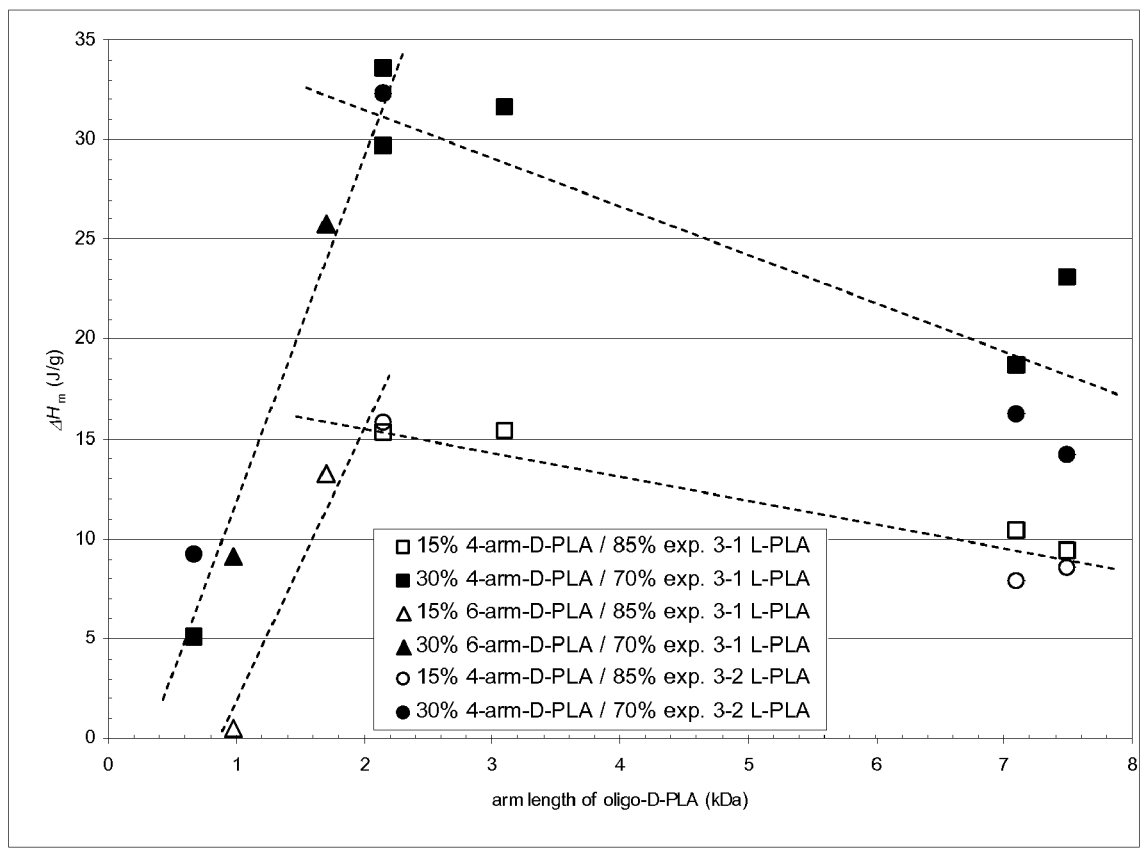

FIG. 1 shows the molar mass [depicted as $M_n$ divided by the number of arms in the star-shaped oligomeric poly(D-lactide)] vs. the melting temperature and FIG. 2 shows the molar mass [depicted as $M_n$ divided by the number of arms in the star-shaped oligomeric poly(D-lactide)] vs. the melt enthalpy. The melting temperature of the blend is not significantly affected by the blend ratio, but is, to a large extent, dependent on the length of the individual arms in the star-shaped oligomeric poly(D-lactides) as can be seen from FIG. 1. However, the degree of crystallinity is affected by both the blend ratio as well as the length of the individual arms in the star-shaped oligomeric poly(D-lactides) as can be seen from FIG. 2.

EXAMPLE 5

Figure 3:
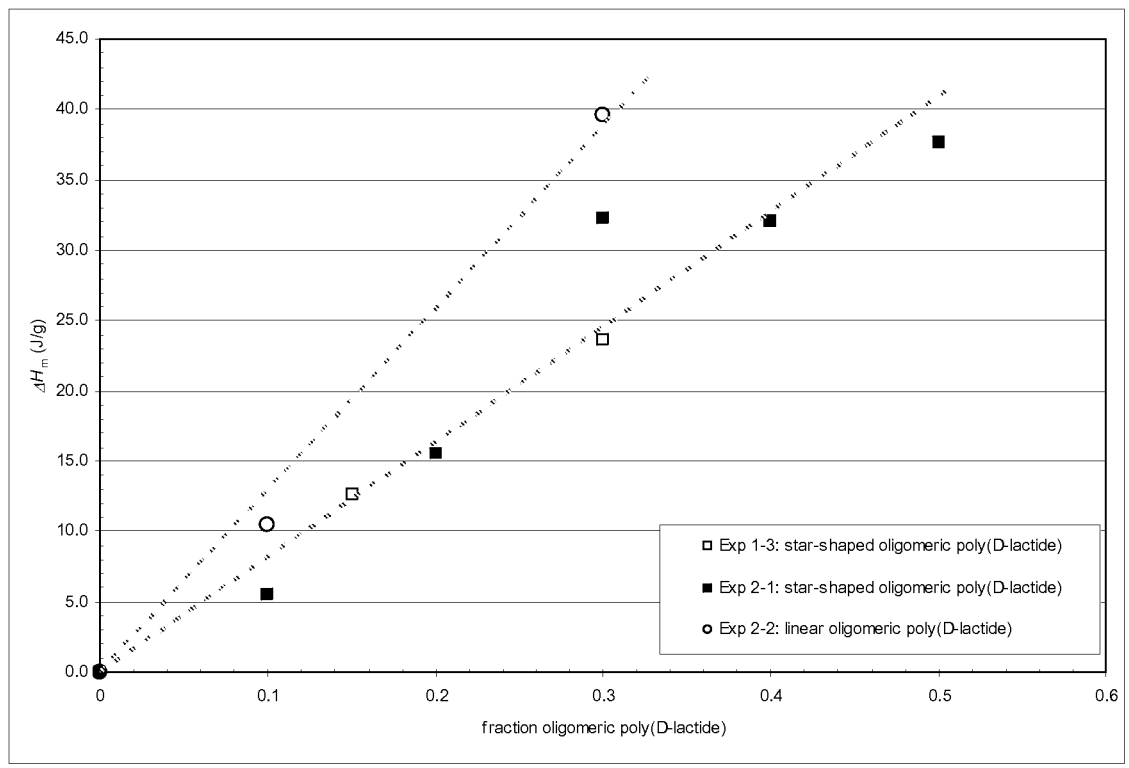
FIG. 3 shows the thermal properties of the films produced in Example 5, as determined by DSC and the crystallinity data.

The Effect of Linear vs. Star-Shaped Oligomeric Poly(D-Lactide) on the Blend Melt Enthalpy Oligomeric poly(D-lactide)s from Experiment 1-3, Experiment 2-1 and Experiment 2-2 were solution blended in chloroform with the poly(L-lactide) of Experiment 3-1 in different blend ratios. The blends were cast into thin films and the films were dried under reduced pressure for an extended period of time. When the films were dry, the thermal properties of the films were determined by DSC and the crystallinity data is presented in FIG. 3. This example shows that the preparation method (i.e. ring opening polymerisation vs. polycondensation) for the oligomeric poly(D-lactide) does not influence the enthalpy of the blend. However, the linear oligomeric poly(D-lactide) blend with the poly(L-lactide) results in a higher crystallinity than corresponding fraction star-shaped oligomeric poly(D-lactide).

EXAMPLE 6

Figure 4:
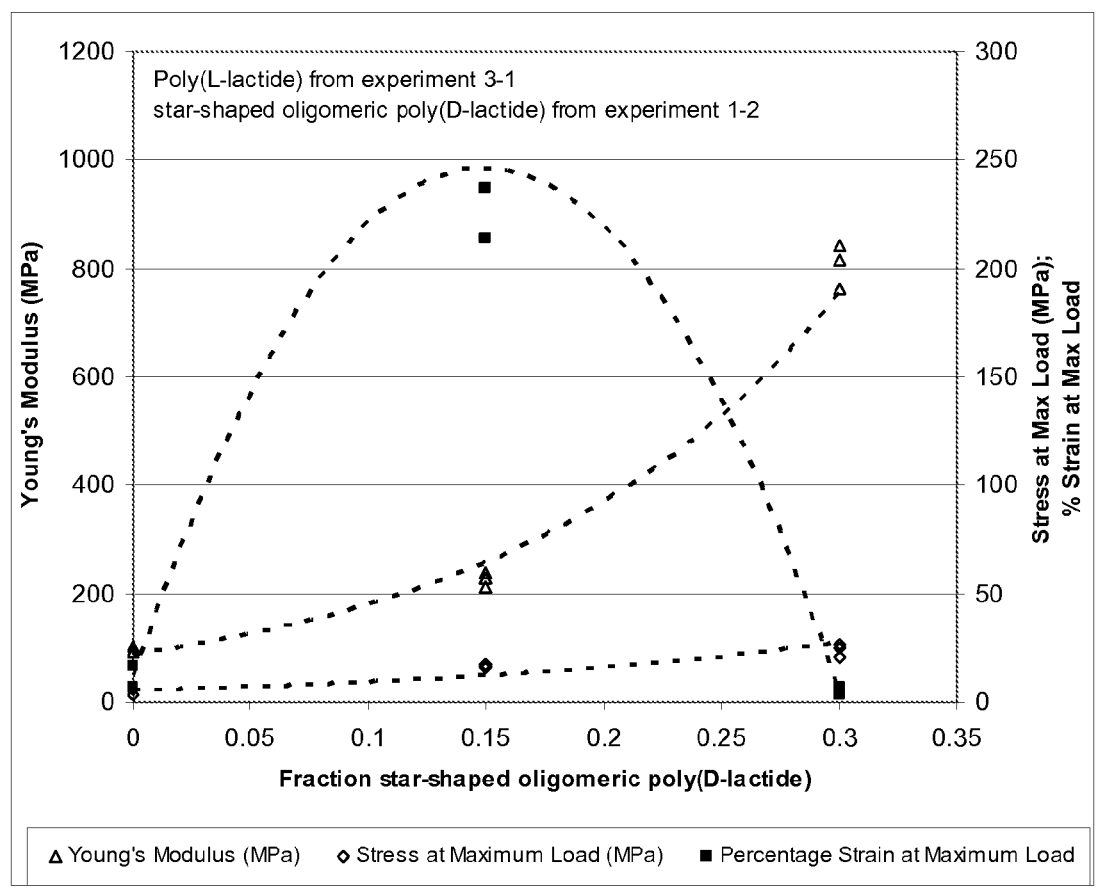
FIG. 4 shows the results from the mechanical testing in Example 6.

The Effect of Star-Shaped Oligomeric Poly(D-Lactide) on the Blend Tensile Strength Poly(L-lactide) from experiment 3-1 and star-shaped oligomeric poly(D-lactide) from experiment 1-2 were blended and solvent-casted into films in the same manner as in Example 4, and the films were then, after extensive drying, subjected to tensile tests. The results from the mechanical testing can be seen in FIG. 4. The example shows that a 10-fold increase in Young's modulus can be obtained for the blend when using 30 wt % star-shaped oligomeric poly(D-lactide) in comparison to non-blended poly(L-lactide).

EXAMPLE 7

Figure 5:
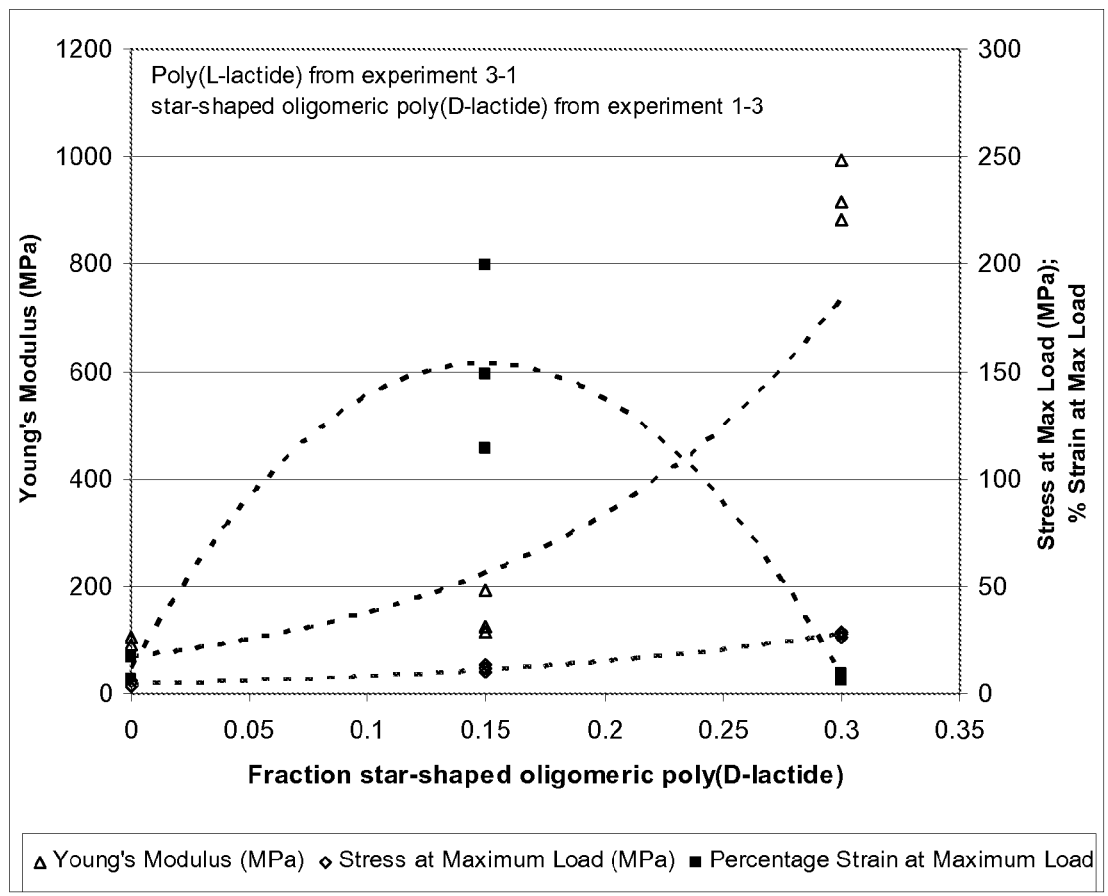
FIG. 5 shows the results from the mechanical testing in Example 7.

The Effect of Star-Shaped Oligomeric Poly(D-Lactide) on the Blend Tensile Strength Example 6 was repeated, except that the star-shaped oligomeric poly(D-lactide) used in this Example was from Example 1-3. The results from the mechanical testing can be seen in FIG. 5.

The invention claimed is:
1. A polymer composition comprising: a first lactic acid polymer which comprises at least three chains of lactic acid units attached to a polyfunctional initiator residue, at least a segment of each chain being in the R- or the S-configuration; and a second lactic acid polymer which is linear and contains at least a segment which has a steric configuration opposite to the steric configuration of the lactic acid polymer chains of the first polymer, wherein the composition has a single melting temperature, and wherein the composition comprises from about 15 weight parts to about 30 weight parts of the first lactic acid polymer and from about 70 weight parts to about 85 weight parts of the second lactic acid polymer, wherein the first lactic acid polymer and the second lactic acid polymer total 100 weight parts.

2. A composition according to claim 1, in which the first lactic acid polymer has the formula (I) or (II):

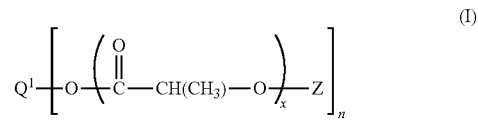

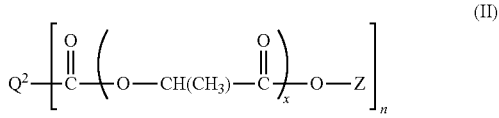

in which:
$Q^1$ represents a residue of a polyhydroxy compound having at least 3 hydroxy groups;
$Q^2$ represents a residue of a polycarboxylic acid having at least 3 carboxylic acid groups;
x is the degree of polymerisation;
Z is an end group; and
n is an integer of at least 3;

or is a polymer of the above formula (I) or (II) having, in addition to the lactic acid units shown, one or more copolymerised chains of a different monomer.

3. A composition according to claim 1, in which the chains of the first polymer are wholly or predominantly R, and the chain or chains of the second polymer are wholly or predominantly S.

4. A composition according to claim 1, in which the chains of the first polymer are wholly or predominantly S, and the chain or chains of the second polymer are wholly or predominantly R.

5. A composition according to claim 1, in which the first polymer is a polymer of lactic acid or lactide with 1,2,3,4,5,6,-cyclohexanehexacarboxylic acid, 1,2,3,4-butanetetracarboxylic acid, trimellitic acid, pyromellitic acid, an anhydride of one of these acids, trimethylolpropane, di-trimethylolpropane, pentaerythritol, dipentaerythritol, or inositol.

6. A composition according to claim 1, in which the second polymer is a polymer of lactic acid or lactide with maleic acid, succinic acid, methylsuccinic acid, glutaric acid, adipic acid, oxalic acid, malonic acid, terephthalic acid, isophthalic acid, 2,6-naphthalenedicarboxylic acid, 2,7-naphthalenedicarboxylic acid, 1,4-naphthalenedicarboxylic acid, 3,4'-diphenyl ether dicarboxylic acid, 4,4'-diphenyl ether dicarboxylic acid, an anhydride of one of these acids, 1,4-butanediol, ethylene glycol, propylene glycol, 1,3-butanediol, or glycerol.

7. A composition according to claim 1, in which the degree of polymerisation of each chain of the first polymer is from 15 to 1000.

8. A composition according to claim 7, in which the degree of polymerisation of each chain of the first polymer is from 30 to 500.

9. A composition according to claim 1, in which the degree of polymerisation of the second polymer is from 15 to 1000.

10. A composition according to claim 9, in which the degree of polymerisation of the second polymer is from 30 to 500.

11. The composition according to claim 8, in which the degree of polymerisation of each chain of the first polymer is from 15 to 45.

12. The composition according to claim 1, wherein the first lactic acid polymer comprises from three to six chains of lactic acid units.

13. The composition according to claim 1, produced by a process comprising:
   co-extruding the first lactic acid polymer and the second lactic acid polymer at elevated temperature.

* * * * *